(No Model.)
J. C. DAGGETT & W. W. WHITCOMB.
Valve for Waste Pipes.
No. 236,674. Patented Jan. 18, 1881.
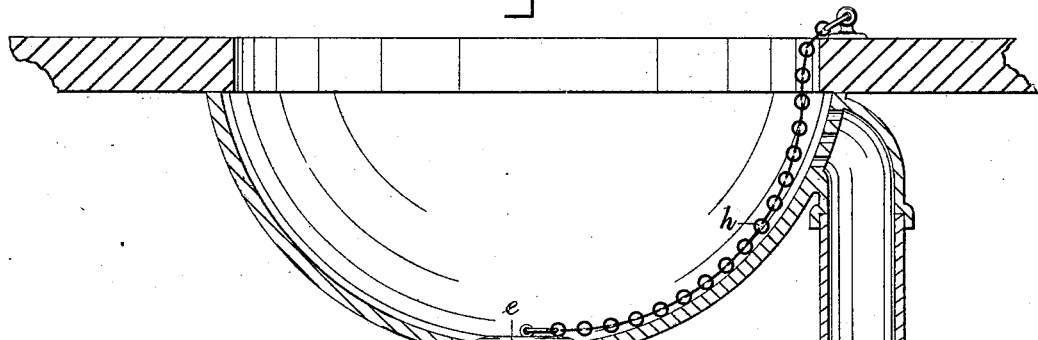
Fig. 1.
Fig. 2.
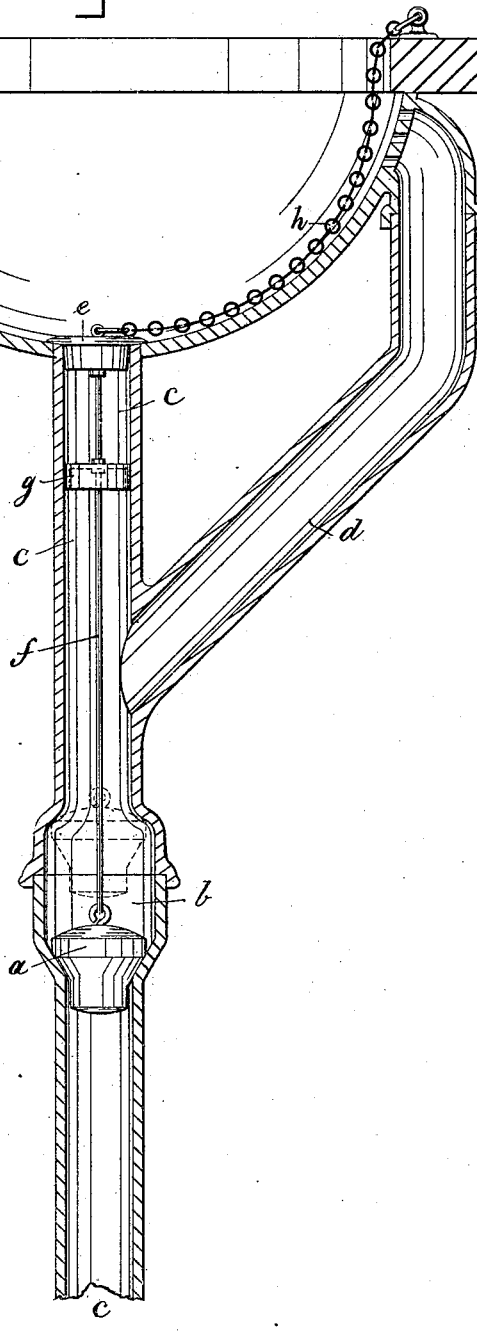
Witnesses.
A. Reynolds
V. D. Dearborn
Inventors.
John C. Daggett & Wm. W. Whitcomb
by Crosby & Gregory Attys.
N. PETERS, PHOTO-LITHOGRAPHER, WASHINGTON, D. C.

UNITED STATES PATENT OFFICE.

JOHN C. DAGGETT AND WILLIAM W. WHITCOMB, OF BOSTON, MASS.

VALVE FOR WASTE-PIPES.

SPECIFICATION forming part of Letters Patent No. 236,674, dated January 18, 1881.

Application filed June 22, 1880. (No model.)

*To all whom it may concern:*

Be it known that we, JOHN C. DAGGETT and WM. W. WHITCOMB, of Boston, county of Suffolk, State of Massachusetts, have invented an Improvement in Valves for Waste-Pipes, of which the following description, in connection with the accompanying drawings, is a specification.

Our invention relates to valves for waste-pipes, and is intended as an improvement on a valve invented by J. C. Daggett, on which Letters Patent No. 229,972 were granted July 13, 1880, to which reference may be had. In the said patent the valve was shown placed in a valve-chamber just below the junction of the usual waste and overflow pipes of a wash-bowl, it being made as a plug to fall by its own weight upon a tapering seat, and thus retain the pipe closed to prevent the escape of gas, except when the said valve is positively raised by the operator to allow the water to escape from the bowl. The valve was therein shown as operated by a shaft extended out of the valve-chamber and arms and a handle connected therewith. In our present invention the said shaft and valve-operating mechanism are dispensed with, the valve being connected and operated simultaneously with the usual stopper or plug of the wash-bowl. We have also added a screen or strainer to prevent the passage of solid matter into the pipe to clog the same.

As herein shown the valve and basin-stopper are connected by a rod, upon which the said screen is secured at a short distance below the said stopper, so that in raising the stopper sufficiently to permit the water to flow out the said strainer remains in the pipe near its point of junction with wash-bowl; but when desired the said screen can be raised just out of the said pipe to enable it to be readily cleaned.

Figure 1 is a vertical section of a wash-bowl and connected apparatus embodying our invention, and Fig. 2 a plan view of the screen detached.

The valve $a$ in the valve-chamber $b$, situated in the waste-pipe $c$ below its junction with the overflow-pipes $d$, are all substantially as in the patent referred to, except that no valve-operating mechanism extends out through the side of the chamber $b$. The valve $a$ is connected with the usual plug or stopper $e$ at the bottom of the wash-bowl by any suitable connection to cause the valve $a$ to be raised simultaneously with the stopper $e$. The connection between the valve $a$ and stopper $e$, as herein shown, has a rod, $f$; but it is obvious that a chain or flexible connector may be used. Upon the said rod $f$, a short distance below the stopper $e$, is secured the screen $g$, (see also Fig. 2,) to prevent the passage of pieces of solid matter of any considerable size through the pipe $c$ into the valve-chamber $b$ to interfere with the proper operation of the valve $a$.

The stopper $e$ is provided with the usual chain $h$, to enable the operator to raise it without necessarily putting his hand in the water which may be in the bowl. When desired to empty the bowl the stopper $e$ is raised in the usual manner, and by the connected rod $f$ also raises and opens the valve $a$, the screen $g$ at the same time being brought a little nearer the top of the pipe $c$.

If any pieces of solid matter collect on the screen $g$, the plug $e$ may be raised as far as the movement of the valve $a$ in its case $b$ (as shown by the dotted lines) will allow, and in such movement the the screen $g$ will be brought to the top of the pipe $c$, so that the said solid matter may be readily removed.

It will be seen that the valve $a$, when constructed and operated as herein described, will always fall to its seat by its own weight, to completely close the waste-pipe $c$ and prevent the passage of gases through said pipe $c$ or the overflow-pipe $d$ in the room in which the wash-bowl is placed, it being impossible to leave the said valve open.

Connecting the valve $a$ and stopper $e$ by a rod, $f$, instead of a flexible connector renders the proper closing of the valve $a$ and stopper $e$ more certain when left by the person using the bowl; but it will answer very well to have only the portion of the connector between the stopper $e$ and screen $g$ rigid, the part below the screen $g$ being flexible. The stopper $e$ will then be guided by the movement of the screen $g$ in the pipe $c$, and always properly come to its seat at the top of the pipe $c$ to allow the valve $a$ to close.

It will be seen that the overflow-pipe may be dispensed with, if desired.

I claim—

1. In a wash bowl or vessel provided with waste and overflow pipes, a valve and valve-seat therefor below the junction of said pipes and a stopper to close the pipe and connections between said stopper and valve to cause the valve to be opened when the stopper is raised, substantially as described.

2. A valve and stopper for waste-pipes, connected, as described, to enable them to be operated simultaneously, combined with a screen in said pipe between the said stopper and valve and connected therewith, substantially as and for the purpose described.

In testimony whereof we have signed our names to this specification in the presence of two subscribing witnesses.

JOHN CODMAN DAGGETT.
WILLIAM W. WHITCOMB.

Witnesses:
JOS. P. LIVERMORE,
N. E. C. WHITNEY.